United States Patent
Kusano (10) Patent No.: US 7,690,736 B2
(45) Date of Patent: Apr. 6, 2010

(54) BRAKING SYSTEM FOR VEHICLE

(75) Inventor: Akihito Kusano, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 545 days.

(21) Appl. No.: 11/601,642

(22) Filed: Nov. 20, 2006

(65) Prior Publication Data

US 2007/0114837 A1 May 24, 2007

(30) Foreign Application Priority Data

Nov. 24, 2005 (JP) ............................. 2005-338947

(51) Int. Cl.
*B60T 8/40* (2006.01)
*F04B 39/10* (2006.01)

(52) U.S. Cl. ...................... 303/116.4; 303/10; 417/554; 417/549; 417/259

(58) Field of Classification Search ................... 303/10, 303/11, 116.4; 417/545, 546, 547, 549, 552, 417/554, 555.1, 558, 254, 258, 259, 262

See application file for complete search history.

(56) References Cited

U.S. PATENT DOCUMENTS

| | | | | |
|---|---|---|---|---|
| 5,577,896 | A | * | 11/1996 | Harada ........................ 417/549 |
| 6,109,896 | A | * | 8/2000 | Schuller et al. ............. 417/549 |
| 6,361,295 | B2 | * | 3/2002 | Schuller et al. ............. 417/549 |
| 6,652,245 | B2 | * | 11/2003 | Hauser et al. ............... 417/549 |
| 7,390,174 | B2 | * | 6/2008 | Dinkel et al. ................ 417/549 |
| 2004/0130206 | A1 | * | 7/2004 | Yang ......................... 303/116.4 |

FOREIGN PATENT DOCUMENTS

| | | |
|---|---|---|
| EP | 0 639 713 A1 | 2/1995 |
| JP | 6-323240 A | 11/1994 |
| JP | 7-035035 A | 2/1995 |

* cited by examiner

*Primary Examiner*—Thomas J Williams
(74) *Attorney, Agent, or Firm*—Buchanan Ingersoll & Rooney PC (57) ABSTRACT

In a liquid pump for a braking system of a vehicle, one end of a piston is slidably inserted into a cylindrical space of a housing member, and a sliding ring is provided on the piston. A suction chamber is formed by an inner peripheral surface of the housing member, an outer peripheral surface of the piston and the sliding ring. An inner diameter "Dk" of the housing member is made larger than an inner diameter "Dc" of the cylindrical space. As a result, the volume of the suction chamber is increased, without making the piston smaller in its diameter.

14 Claims, 4 Drawing Sheets

FIG. 6 ns for vehic# BRAKING SYSTEM FOR VEHICLE

CROSS REFERENCE TO RELATED APPLICATION

This application is based on Japanese Patent Application No. 2005-338947 filed on Nov. 24, 2005, the disclosure of which is incorporated herein by reference.

FIELD OF THE INVENTION

The present invention relates to a braking system for a vehicle, in which brake fluid is circulated in a hydraulic system by a piston pump.

BACKGROUND OF THE INVENTION

A piston type liquid pump for a braking system of a vehicle is known in the art, for example, as disclosed in Japanese Patent Publication No. H07-035035. The liquid pump of the prior art has a pump chamber and a suction chamber, wherein the volume of the suction chamber is decreased when the volume of the pump chamber is decreased and the volume of the suction chamber is increased when the volume of the pump chamber is increased, in accordance with a reciprocal movement of a piston. The liquid pump pressurizes the brake fluid supplied from an inlet port to the pump chamber through the suction chamber, and discharges the pressurized brake fluid. As above, the suction of the brake fluid from the outside of the pump into the suction chamber and the discharge of the brake fluid to the outside of the pump are alternately carried out in accordance with the reciprocal movement of the piston.

When the liquid pump of the above type is applied to a braking system having a return fluid path, a pulsation is likely to be increased, because pressure variation is alternately carried out in the return fluid path as a result of the suction and discharge of the brake fluid. The above pulsation is generated not only in the return fluid path but also in a fluid circulation path through which the brake fluid is circulated. Then, it may cause a problem of noise generation, when the pulsation is increased in the return fluid path and/or the fluid circulation path.

According to another prior art, for example, as disclosed in Japanese Patent Publication No. H06-323240, a liquid pump of the piston type has a suction chamber, the volume of which is increased when the volume of a pump chamber is decreased, whereas the volume of the suction chamber is decreased when the volume of the pump chamber is increased. According to such prior art, the suction of the brake fluid from the outside of the pump into the suction chamber and the discharge of the brake fluid to the outside of the pump are concurrently carried out in accordance with the reciprocal movement of the piston. Pressure variation of the brake fluid in the return fluid path as well as the fluid circulation path is suppressed with such liquid pump, and the pulsation may be hardly caused.

It is desirable to make the suction volume of the pump closer to the discharge volume of the pump in order to suppress the pulsation.

According to the pump of the above prior art (JPH06-323240), the suction chamber is formed by an inner peripheral surface of a pump housing and an outer peripheral surface of the piston, wherein an inner diameter of the inner peripheral surface of the pump housing is made equal to or smaller than an inner diameter of a cylindrical space of the pump housing, into which one end of the piston is slidably inserted. In other words, an outer diameter of the piston on the opposite side to the cylindrical space is made smaller than an outer diameter of the piston on the side to the cylindrical space (at which the end of the piston is inserted into the cylindrical space). With such a structure, a necessary cross sectional area (when viewed in an axial direction of the cylindrical space) and thereby a necessary suction volume is achieved.

According to such a structure, however, the diameter of the other end of the piston is made smaller in order to increase the suction volume (to make the suction volume equal to or closer to the discharge volume). Such a small diameter portion of the piston is not always preferable in view of mechanical strength of the piston.

SUMMARY OF THE INVENTION

The present invention is made in view of the foregoing problems, and has an object to provide a braking system for a vehicle, according to which pulsation in a hydraulic system is properly suppressed and high mechanical strength of a piston for a piston pump is achieved.

According to one of features of the invention, for example, as defined in claim 1 of the present invention, a braking system for a vehicle has; a hydraulic system for applying braking pressure to a braking device of a wheel for the vehicle; a return fluid path, forming a part of the hydraulic system, and operatively communicated with a wheel cylinder of the braking device for circulating brake fluid from the wheel cylinder in the hydraulic system; and a liquid pump provided in the return fluid path.

The liquid pump has; a pump housing and a piston; a suction chamber formed in the pump housing, into which the brake fluid is sucked through an inlet port formed in the pump housing; a cylindrical space formed in the pump housing, into which one end of the piston is fluid-tightly and slidably inserted to form a pump chamber, so that the brake fluid supplied from the suction chamber is pressurized; a supporting hole formed in the pump housing and coaxially arranged with the cylindrical space, into which the other end of the piston is fluid-tightly and slidably inserted; and a sliding ring provided at the piston for fluid-tightly sealing a space between an outer peripheral surface of the piston and an inner peripheral surface of the pump housing, so that the suction chamber is formed by the pump housing, the piston, and the sliding ring.

In the above liquid pump, the suction chamber increases its volume when a volume of the pump chamber is decreased in accordance with a reciprocal movement of the piston, whereas the suction chamber decreases its volume when the volume of the pump chamber is increased in accordance with the reciprocal movement of the piston, and an inner diameter "Dk" of the pump housing for forming the suction chamber is made larger than an inner diameter "Dc" of the cylindrical space.

According to the above structure, the volume of the suction chamber is increased when the volume of the pump chamber is decreased in accordance with the reciprocal movement of the piston, namely in accordance with the movement of the sliding ring together with the piston. In the same manner, the volume of the suction chamber is decreased when the volume of the pump chamber is increased. Accordingly, the suction and the discharge of the brake fluid are concurrently carried out in accordance with the reciprocal movement of the piston. As a result, the generation of the pulsation is suppressed in the fluid path, in which the liquid pump is provided, when the brake fluid is circulated in the hydraulic system. The generation of the pulsation is also suppressed in a fluid circulation path, when the brake fluid is circulated from and back to the liquid pump through the fluid circulation path.

Furthermore, according to the above structure, the inner diameter "Dk" of the pump housing for forming the suction chamber is made larger than the inner diameter "Dc" of the cylindrical space. The suction volume can be increased while the outer diameter of the piston is maintained at a larger value, when compared with such a case in which the inner diameter of the pump housing for forming the suction chamber is made equal to or smaller than the inner diameter of the cylindrical space. As a result, the suction volume is made closer to the discharge volume to properly suppress the generation of the pulsation on one hand and to achieve a high mechanical strength for the piston on the other hand.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A first embodiment of the present invention will be explained with reference to the drawings of FIGS. 1 to 3.

Figure 1:
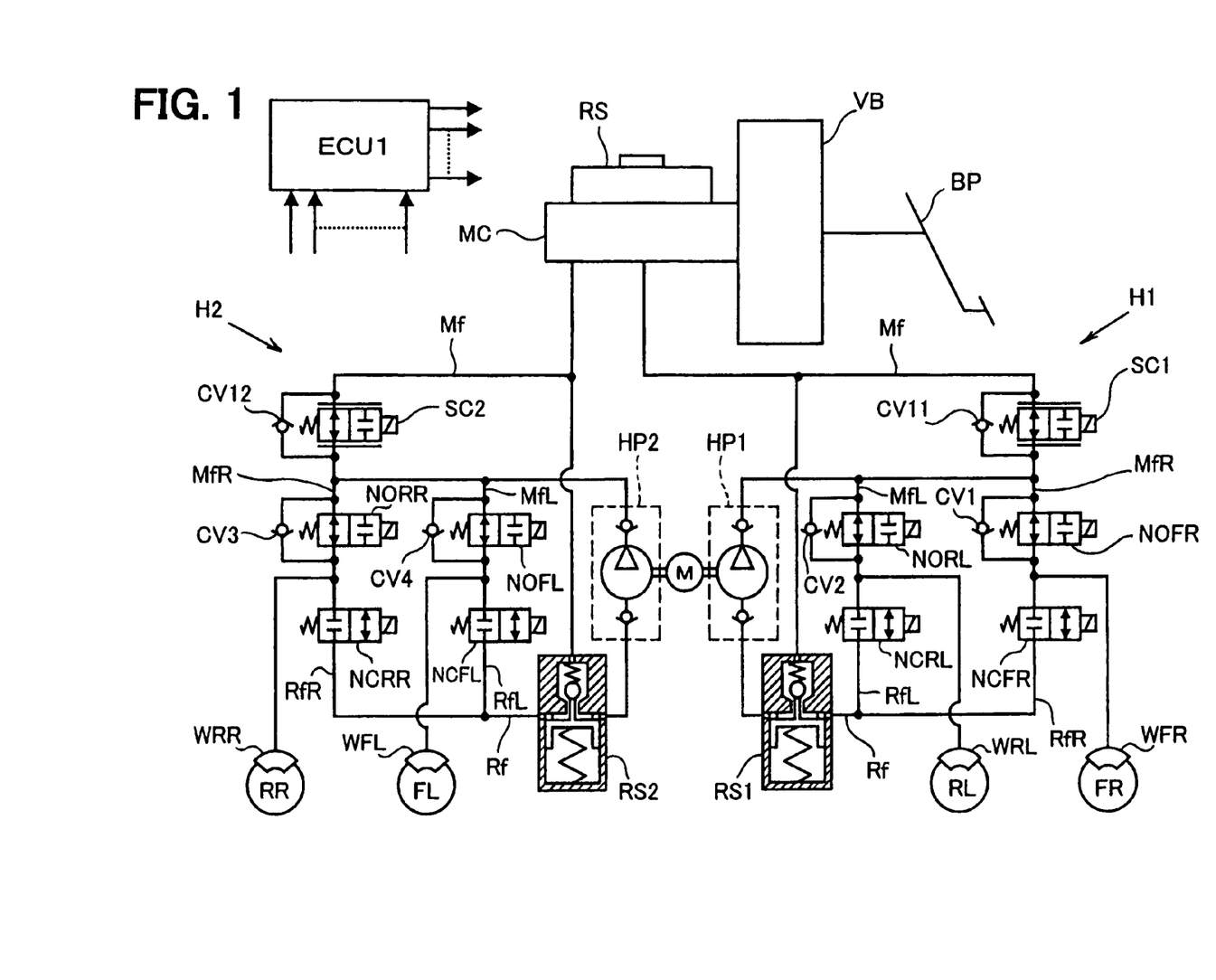
FIG. 1 is a schematic view showing a braking system for a vehicle, according to an embodiment of the present invention.

In a braking system for a vehicle according to the embodiment of the present invention, as shown in FIG. 1, a brake pedal BP for performing a braking operation of the vehicle is operatively linked with a master cylinder MC of a well known tandem type, via also well known vacuum booster VB. A pair of pressure generating chambers (not shown) is formed in the master cylinder MC, wherein the pressure generating chambers are arranged at right and left hand sides of the master cylinder MC in FIG. 1. When the brake pedal BP is operated, the respective pressure generating chambers are blocked off from a main reservoir RS, pressure of which is maintained at atmospheric pressure. And fluid pressure is generated at the respective pressure generating chambers, corresponding to a braking force applied to the brake pedal BP.

The pressure generating chamber of the master cylinder MC on the right hand side is fluidically connected to a first hydraulic system H1, which includes hydraulic path for a braking device FR of a front right wheel and a braking device RL of a rear left wheel. In the similar manner, the pressure generating chamber of the master cylinder MC on the left hand side is fluidically connected to a second hydraulic system H2, which includes hydraulic path for a braking device FL of a front left wheel and a braking device RR of a rear right wheel. According to the embodiment, the present invention is applied to a vehicle of a front wheel drive type, in which an X-type hydraulic braking pipe arrangement is used. However, the present invention may be applied to any other types of the hydraulic braking pipe arrangement, for example, a front-rear pipe arrangement.

The pressure generating chamber of the master cylinder MC for the first hydraulic system H1 is operatively and fluidically connected to a wheel cylinder WFR of the braking device FR of the front right wheel and also to a wheel cylinder WRL of the braking device RL of the rear left wheel, via a main fluid path Mf and bifurcated fluid paths MfR and MfL. A (electromagnetic) proportioning valve SC1 of a normally open type is provided in the main fluid path Mf, and a check valve CV11 is provided in parallel with the proportioning valve SC1.

The check valve CV11 allows brake fluid to flow from the pressure generating chamber of the master cylinder MC to the wheel cylinders WFR, WRL, and prohibits the fluid flow in a reversed direction. Accordingly, even when the proportioning valve SC1 is closed, the check valve CV11 enables supply of the brake fluid from the master cylinder (MC) side to the wheel cylinder (WFR, WRL) side, in the case the pressure generated in the master cylinder (MC) side becomes higher than the pressure in the wheel cylinder (WFR, WRL) side. The proportioning valve SC1 controls a pressure difference between the pressure in the master cylinder (MC) side and the pressure in the wheel cylinder (WFR, WRL) side, in accordance with a value of electric current supplied to the electromagnetic proportioning valve SC1.

Electromagnetic valves NOFR, NORL of a normally open type are provided in the respective bifurcated fluid paths MfR, MfL. Check valves CV1 and CV2 are also provided in the bifurcated fluid paths MfR, MfL in parallel with the electromagnetic valves NOFR and NORL. The check valves CV1 and CV2 allow the brake fluid to flow in the direction toward the master cylinder MC, and prohibit the fluid flow in the direction to the wheel cylinders WFR, WRL. Accordingly, the brake fluid in the wheel cylinders WFR, WRL may return to the master cylinder MC and further to the main reservoir RS through the check valves CV1, CV2 and the proportioning valve SC1, when the proportioning valve SC1 is opened.

According to the above structure of the braking system, when the brake pedal BP is released, the fluid pressure in the wheel cylinders WFR, WRL quickly responds to (follows) the pressure decrease of the brake fluid in the master cylinder side.

Electromagnetic valves NCFR and NCRL of a normally closed type are respectively provided in bifurcated fluid paths RfR and RfL on a discharge side, which are connected to the wheel cylinders WFR and WRL. Both of the bifurcated fluid paths RfR and RfL are connected to a return fluid path Rf, which is connected to a sub reservoir RS1. The sub reservoir RS1 is separately provided from the main reservoir RS for the master cylinder MC, and operated as an accumulator. The sub reservoir RS1 has a piston and a spring for temporally storing the brake fluid in a reserving chamber, which is necessary for various kinds of braking operations.

A liquid pump HP1 is provided in the first hydraulic system H1. An inlet port of the liquid pump HP1 is connected to the main fluid path Mf and the return fluid path Rf via the sub reservoir RS1, whereas an outlet port is connected to the main fluid path Mf at a point between the proportioning valve Sc1 and the electromagnetic valves NOFR, NORL. The liquid pump HP1 is driven by an electric motor M, wherein a liquid pump HP2 in a second hydraulic system H2 is commonly driven by the electric motor M. The liquid pump HP1 draws the brake fluid from the reserving chamber of the sub reservoir RS1 through the inlet port, and discharges pressurized brake fluid from the outlet port.

A mechanical valve device is provided in the sub reservoir RS1, which shuts off a communication between the main fluid path Mf and the reserving chamber when amount of the accumulated brake fluid therein becomes larger than a predetermined value, and communicates the reserving chamber with the main fluid path when the amount of the accumulated brake fluid therein is lower than the predetermined value. The liquid pump HP1 and the return fluid path Rf are fluidically connected with each other via the sub reservoir RS1 but not through such mechanical valve device.

The proportioning valve SC1, the electromagnetic valves NOFR, NORL, NCFR, NCRL, and the electric motor M are operated by an electronic control unit (ECU) 1, such that the fluid pressures in the wheel cylinders WFR and WRL are respectively adjusted.

The second hydraulic system H2 has the same structure to that of the first hydraulic system H1. Accordingly, the proportioning valve SC2, and the electromagnetic valves NORR, NOFL, NCRR, NCFL are operated by the electronic control unit (ECU) 1, such that the fluid pressure in the wheel cylinders WRR (rear right) and WFL (front left) are respectively adjusted, as in the same manner to the first hydraulic system H1.

Various output signals are inputted to the ECU 1 from different kinds of sensors (not shown), such as a wheel speed sensor for the front right wheel, a wheel speed sensor for the front left wheel, a wheel speed sensor for the rear right wheel, a wheel speed sensor for the rear left wheel, a brake pedal switch for detecting whether the brake pedal BP is operated. The ECU 1 performs, based on the signals inputted to the ECU 1, an anti-lock braking operation, a traction control operation, and so on. In the anti-lock braking operation, the fluid pressures of the brake fluid in the respective wheel cylinders are adjusted such that a wheel slip amount may not become an excessive amount during the braking operation. In the traction control operation, the fluid pressures of the brake fluid in the respective wheel cylinders are adjusted such that a wheel slip amount of a driving wheel may not become an excessive amount during operations of starting and/or accelerating the vehicle.

In the braking system as described above, the respective electromagnetic valves are in their respective normal valve positions, namely in the opened or closed positions as shown in FIG. 1, when the vehicle is running in a normal condition. The electric motor M is not operated in the normal condition. When the brake pedal BP is operated, the vacuum booster VB is operated to increase the fluid pressure in the master cylinder MC. The pressure generating chambers in the master cylinder MC generate the fluid pressure corresponding to the braking force applied to the brake pedal BP, and the fluid pressure is applied to the first and second hydraulic systems H1 and H2. The fluid pressure from the master cylinder MC to the first hydraulic system H1 is respectively applied to the wheel cylinders WFR and WRL of the braking devices FR and RL for the front right and rear left wheels, through the proportioning valve SC1 and the electromagnetic valves NOFR and NORL.

In the similar manner, the fluid pressure from the master cylinder MC to the second hydraulic system H2 is respectively applied to the wheel cylinders WFL and WRR of the braking devices FL and RR for the front left and rear right wheels, through the proportioning valve SC2 and the electromagnetic valves NOFL and NORR. As above, the four braking devices FR, FL, RR, RL are operated to apply braking torque to the respective wheels, so that the vehicle is controlled under the braking operation.

When the braking force is released from the brake pedal BP, the vacuum booster VB returns to its normal condition, so that the master cylinder MC returns to its normal condition. Then, the fluid pressure in the pressure generating chambers of the master cylinder MC and applied to the first and second hydraulic systems H1 and H2 is decreased to the atmospheric pressure. As a result, the fluid pressure in the respective wheel cylinders WFR, WFL, WRR, WRL is likewise decreased to the atmospheric pressure, such that the braking devices FR, FL, RR, RL return to their normal conditions. Thus, the braking operation for the vehicle is stopped.

An operation for the anti-lock control will be explained.

During the braking operation of the vehicle, the ECU 1 determines, based on the output signals from the respective wheel speed sensors, whether the braking slip amount may be likely to exceed the predetermined value (the excessive slip amount). For example, when the ECU 1 determines that the braking slip amount of the front right wheel is likely to exceed the predetermined value, the valve position of the electromagnetic valve NOFR is switched from its normal opened position to the closed position, whereas the valve position of the electromagnetic valve NCFR is switched from its normal closed position to the opened position. At the same time, the electric motor M is operated. Then, the brake fluid is discharged from the wheel cylinder WFR to the sub reservoir RS1 through the electromagnetic valve NCFR, so that the fluid pressure in the wheel cylinder WFR is decreased. As above, the braking torque applied by the braking device FR to the front right wheel is decreased to reduce the braking slip amount at the front right wheel.

The brake fluid, which is discharged from the wheel cylinder WFR to the sub reservoir RS1 through the electromagnetic valve NCFR, is returned to the fluid path between the proportioning valve SC1 and the bifurcated fluid paths NOFR, NORL by the operation of the liquid pump HP1 driven by the electric motor M. The brake fluid is further returned to the pressure generating chamber of the master cylinder MC through the proportioning valve SC1.

When the braking slip amount for the front right wheel is substantially decreased, as above, the ECU 1 controls the electromagnetic valves NCFR and NOFR, such that the valve position of the valve NCFR is switched from the opened position to the closed position, whereas the valve position of the valve NOFR is switched from the closed position to the opened position. Then, the brake fluid is again supplied from the master cylinder MC to the wheel cylinder WFR to thereby increase the fluid pressure in the wheel cylinder WFR. Accordingly, the braking torque applied to the front right wheel by the braking device FR is increased.

During this operation, when the braking slip amount for the front right wheel is increased in accordance with the increase of the braking torque, and reaches a value close to the predetermined value (the excessive slip amount), the ECU 1 operates the electromagnetic valve NOFR, such that the valve position thereof is switched from the opened position to the closed position. As a result, the fluid pressure in the wheel cylinder is prevented from further increasing, and the fluid pressure is maintained at such braking pressure.

During the fluid pressure for the wheel cylinder WFR of the front right wheel is maintained at the braking pressure, as above, when the braking slip amount is increased to be likely to exceed the predetermined value (the excessive braking slip amount), the valve position of the electromagnetic valve FCFR is controlled by the ECU 1, so that the valve position is switched from the closed position to the opened position. The brake fluid is, therefore, discharged from the wheel cylinder WFR to the sub reservoir RS1 through the electromagnetic valve NCFR, to decrease the fluid pressure in the wheel cylinder WFR. Accordingly, the braking torque applied by the braking device FR to the front right wheel is again decreased to reduce the braking slip amount at the front right wheel.

As above, the electromagnetic valves NOFR and NCFR are controlled to switch over from the valve closed position to the valve opened position, and vice versa, in accordance with the braking slip amount of the front right wheel (which is under the braking operation), and the liquid pump HP1 is also operated depending on the above valve positions. The fluid pressure in the wheel cylinder WFR is controlled among the operational modes of "the pressure decrease", "the pressure increase" and "the pressure holding". Thus, the braking slip amount of the front right wheel during the braking operation is prevented from exceeding the predetermined value (the excessive braking slip amount).

The fluid pressure in the wheel cylinder WFL of the front left wheel is controlled by the ECU 1 in the same manner to the operation for the front right wheel, so that the braking slip amount of the front left wheel is prevented from exceeding the predetermined value (the excessive braking slip amount). Namely, the electromagnetic valves NOFL and NCFL are controlled to switch over from the valve closed position to the valve opened position, and vice versa, in accordance with the braking slip amount of the front left wheel (which is under the braking operation), and the liquid pump HP2 is also operated depending on the above valve positions. The fluid pressure in the wheel cylinder WFL is controlled among the operational modes of "the pressure decrease", "the pressure increase" and "the pressure holding".

The fluid pressure in the wheel cylinder WRL of the rear left wheel is also controlled by the ECU 1 in the same manner to the operation for the front right wheel, so that the braking slip amount of the rear left wheel is prevented from exceeding the predetermined value (the excessive braking slip amount). Namely, the electromagnetic valves NORL and NCRL are controlled to switch over from the valve closed position to the valve opened position, and vice versa, in accordance with the braking slip amount of the rear left wheel (which is under the braking operation), and the liquid pump HP1 is also operated depending on the above valve positions. The fluid pressure in the wheel cylinder WRL is controlled among the operational modes of "the pressure decrease", "the pressure increase" and "the pressure holding".

Furthermore, the fluid pressure in the wheel cylinder WRR of the rear right wheel is likewise controlled by the ECU 1 in the same manner to the operation for the front right wheel, so that the braking slip amount of the rear right wheel is prevented from exceeding the predetermined value (the excessive braking slip amount). Namely, the electromagnetic valves NORR and NCRR are controlled to switch over from the valve closed position to the valve opened position, and vice versa, in accordance with the braking slip amount of the rear right wheel (which is under the braking operation), and the liquid pump HP2 is also operated depending on the above valve positions. The fluid pressure in the wheel cylinder WRR is controlled among the operational modes of "the pressure decrease", "the pressure increase" and "the pressure holding".

An operation for the traction control will be explained. In the traction control operation, the driving slip amount for the driving wheels during the starting and/or accelerating operation of the vehicle is controlled not to exceed a predetermined value (an excessive driving slip amount). The vehicle, to which the present invention is applied in this embodiment, is the front wheel drive vehicle.

The brake pedal BP is generally not operated during the starting and/or accelerating operation of the vehicle. Therefore, the respective electromagnetic valves are positioned at their initial normal conditions, as shown in FIG. 1. And the electric motor M is not operated, either.

For example, when the driving slip amount of the front right wheel is likely to exceed the predetermined value, the ECU 1 switches over the valve positions of the proportioning valve SC1 and the electromagnetic valve NORL from the valve opened position to the valve closed position, and starts the operations of the liquid pumps HP1 and HP2 by driving the electric motor M. The liquid pump HP1 draws through its inlet port the brake fluid from the main reservoir RS via the master cylinder MC and the sub reservoir RS1, and discharges the pressurized brake fluid through its outlet port.

The brake fluid discharged from the liquid pump HP1 is supplied to the wheel cylinder WFR through the electromagnetic valve NOFR, so that the fluid pressure in the wheel cylinder WFR is increased to operate the braking device FR for the front right wheel. As a result, the braking torque is applied to the front right wheel. Then, the increase of wheel speed for the front right wheel is suppressed, and the increase of the driving slip amount is thereby suppressed. The ECU 1 controls the proportioning valve SC1 in order to adjust the fluid pressure in the wheel cylinder WFR, such that the driving slip amount for the front right wheel is maintained at a proper amount.

When the driving slip amount of the front left wheel is likely to exceed the predetermined value, the ECU 1 controls the proportioning valve SC2, as in the same manner to the operation for the front right wheel, in order to adjust the fluid pressure in the wheel cylinder WFL, such that the driving slip amount for the front left wheel is maintained at a proper amount.

In the above operation, a fluid circulation passage is formed in the first hydraulic system H1, such that the brake fluid pumped out from the outlet port of the liquid pump HP1 is circulated through the proportioning valve SC1 and the sub-reservoir RS1 and sucked into the inlet port of the liquid pump HP1. In the same manner, a fluid circulation passage is formed in the second hydraulic system H2, such that the brake fluid pumped out from the outlet port of the liquid pump HP2 is circulated through the proportioning valve SC2 and the sub-reservoir RS2 and sucked into the inlet port of the liquid pump HP2. In the above operation of the fluid circulation, the proportioning valves SC1 and SC2 are respectively controlled to open and close its passage.

In the above braking system, it is desirable to suppress the pulsation of the brake fluid caused by the operation of the liquid pumps HP1 and HP2 to a small range, so that the generation of the noise during the operation of the braking control (the operation for controlling the hydraulic pressure in the braking system).

According to the present invention, therefore, a structure for suppressing the pulsation is provided in the liquid pumps HP1 and HP2. The detailed structure of the liquid pumps HP1, HP2 according to the first embodiment will be explained with reference to FIGS. 2 and 3, wherein FIG. 2 shows the liquid pump in which a piston is positioned at its top dead center, whereas FIG. 3 shows the liquid pump in which the piston is positioned at its bottom center. The liquid pumps HP1 and HP2 have the same structure to each other. Therefore, the structure for the liquid pump HP1 is explained.

Figure 2:
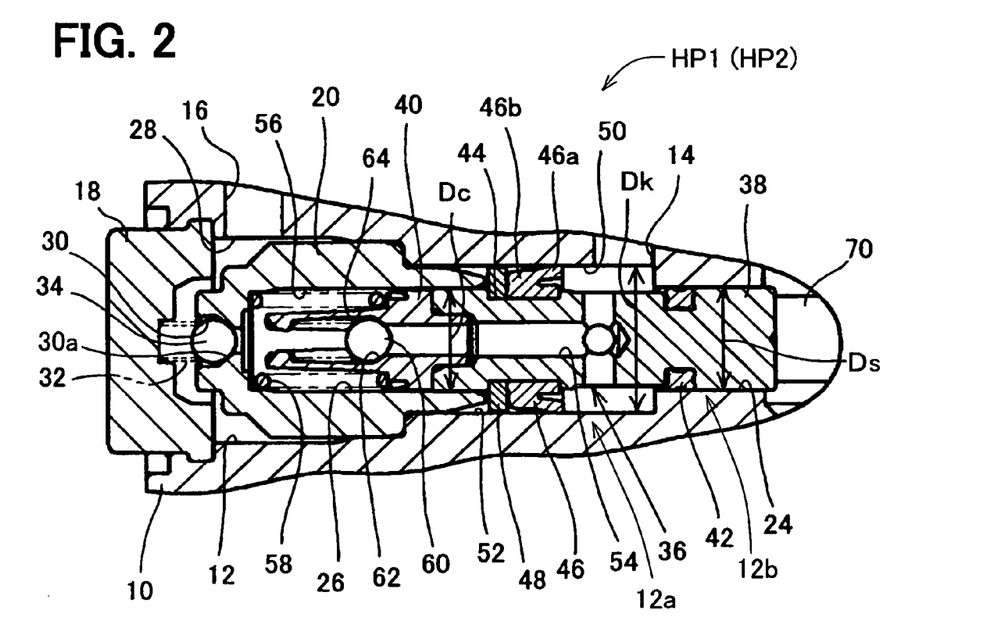
FIG. 2 is a cross sectional view showing a liquid pump of a first embodiment, wherein a piston is positioned at its top dead center.
Figure 3:
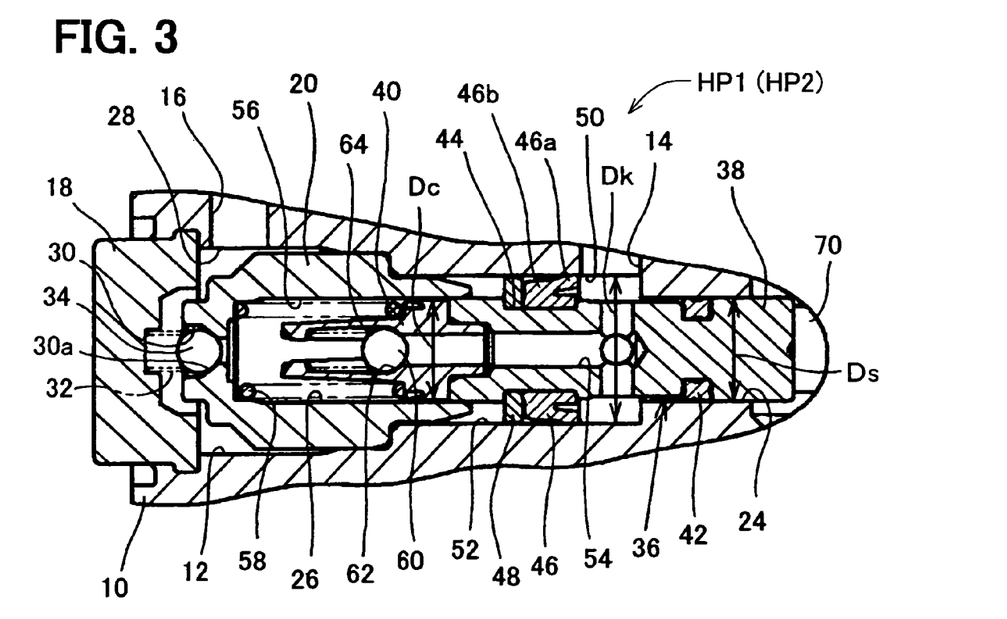
FIG. 3 is a cross sectional view showing the liquid pump of the first embodiment, wherein the piston is positioned at its bottom dead center.

In FIGS. 2 and 3, a cylindrical hole 12 having stepped portions (first and second small diameter portions 12a and 12b) is formed in a first housing member 10. An inlet port 14 and an outlet port 16 are provided in the first housing member 10, wherein the inlet and outlet ports 14 and 16 are separately formed with respect to an axial direction of the first housing member 10 and each one end of the ports is opened to the cylindrical hole 12. A second housing member 18 is firmly and fluid-tightly fixed to an open end (a left hand end) of the first housing member 10, by a caulking method or the like.

A third housing member 20 is press fitted into the first small diameter portion 12a of the cylindrical hole 12, so that an outer peripheral surface is fluid-tightly contacted with an inner peripheral surface of the first small diameter portion of the first housing member 10. The first to third housing members 10, 18 and 20 form the housing for the liquid pump HP1.

A cylindrical space 26 is formed in the third housing member 20, wherein the cylindrical space 26 has an open end at its right hand end and a closed end on the opposite end (a left hand end). A discharge chamber 28 is formed between the second and third housing members 18 and 20. A valve port 30 is provided at the left hand end of the third housing member 20, so that the cylindrical space 26 is operatively communicated with the discharge chamber 28. A valve seat 30a is formed at a middle portion of the valve port 30. A valve body 34 of a spherical shape is seated on the valve seat 30a, wherein the valve body 34 is biased by a coil spring 32 in a direction toward the valve seat 30a. A discharge valve device is formed by the valve seat 30a, the coil spring 32, and the valve body 34. The discharge chamber 28 is always communicated with the outlet port 16.

A piston 36 is slidably arranged in the cylindrical hole 12. More specifically, a left hand end of the piston 36 is slidably inserted into the open end of the cylindrical space 26, and a right hand end of the piston 36 is slidably supported by a supporting hole 24, which is the stepped portion of the cylindrical hole 12 and formed as the second small diameter portion 12b. In this embodiment, an inner diameter "Dc" of the cylindrical space 26 is designed to be equal to an inner diameter "Ds" of the supporting hole 24.

The piston 36 is composed of a forward portion 40 and a supporting portion 38, wherein a right hand end of the forward portion 40 is press fitted into a left hand end of the supporting portion 38, so that the forward portion 40 and the supporting portion 38 move as one integral unit (i.e. the piston 36). The supporting portion 38 is slidably inserted into the supporting hole 24. A sealing member 42 is arranged in a circular sealing groove formed at an outer peripheral surface of the supporting portion 38, for sealing a gap between the outer peripheral surface of the supporting portion 38 (the piston 36) and the inner peripheral surface of the supporting hole 24.

An annular sliding groove 44 is formed at the outer peripheral surface of the supporting portion 38, wherein the annular sliding groove 44 is formed on the left side of the circular sealing groove. A sliding ring 46 is arranged at an outer periphery of the annular sliding groove 44. The sliding ring 46 is made of an elastic material and fluid tightly contacted with the outer peripheral surface of the annular sliding groove 44 due to its own contracting force. The sliding ring 46 has an annular body portion 46b and an annular flanged portion 46a, which is radially and inwardly compressed by the inner peripheral surface of the first small diameter portion 12a of the cylindrical hole 12, such that the outer peripheral surface of the annular flanged portion 46a is slidable with respect to the inner peripheral surface of the cylindrical hole 12 (the first small diameter portion 12a) and the flanged portion 46a is sealing a gap between the outer peripheral surface of the supporting portion 38 and the inner peripheral surface of the cylindrical hole 12. A retainer 48 is provided around the annular sliding groove 44 at the left hand thereof, so that an excessive deformation of the sliding ring 46 is suppressed.

The sliding ring 46 separates, in the axial direction, a space in the cylindrical hole 12 (the first small diameter portion 12a) between the third housing member 20 and the supporting hole 24 into a space 52 on the third housing side and a space 50 on a side of the supporting hole 24. The space 50 formed on the side of the supporting hole 24 forms a suction chamber 50 normally communicated with the inlet port 14. The space 52 formed on the third housing side forms a sealed chamber.

The left hand end of the supporting portion 38 as well as the forward portion 40 are slidably inserted into the cylindrical space 26, to form a pump chamber 56 in the cylindrical space 26. A through hole 54 is formed in the piston 36, namely in the supporting portion 38 and the forward portion 40, so that the brake fluid introduced into the suction chamber 50 through the inlet port 14 is supplied into the pump chamber 56.

A coil spring 58 is arranged in the pump chamber 56 for biasing the piston 36 (38, 40) in the rightward direction. A valve body 60 of a spherical shape and a coil spring 64 are assembled in the inside of the forward portion 40, such that the coil spring 64 biases the valve body 60 toward a valve seat 62 formed at a left hand end of the through hole 54. The valve body 60, the coil spring 64, and the valve seat 62 form a suction valve device.

A right hand end of the piston 36 (the supporting portion 38) is in contact with an eccentric cam 70, which is driven by the electric motor M. The piston 36 is moved in the leftward direction by the eccentric cam 70, and moved in the rightward direction by the spring force of the coil spring 58. When the eccentric cam 70 is rotated by the electric motor M, the piston 36 is moved from its top dead center, shown in FIG. 2, in the rightward direction by the coil spring 58 toward the bottom dead center.

In a suction stroke, in which the piston 36 is moved in the rightward direction to the bottom dead center, the volume of the pump chamber 56 is increased, whereas the volume of the suction chamber 50 is decreased in accordance with the movement of the sliding ring 46 in the rightward direction. The brake fluid in the suction chamber 50 is supplied into the pump chamber 56 through the through hole 54, during which the valve body 60 is separated from the valve seat 62.

In a discharge stroke, in which the piston 36 is moved toward the top dead center after the piston 36 has reached at the bottom dead center, the volume of the pump chamber 56 is decreased in accordance with the movement of the piston 36 in the leftward direction. The brake fluid in the pump chamber 56 is pressurized to move the valve body 34 away from the valve seat 30a, and the brake fluid is pumped out into the discharge chamber 28. During the discharge stroke, the sliding ring 46 is moved together with the piston 36 in the leftward direction, so that the volume of the suction chamber 50 is increased in accordance with the movement of the piston 36. As a result, the brake fluid is sucked into the suction chamber 50 through the inlet port 14.

As above, the suction stroke (in which the piston 36 is moved from the top dead center to the bottom dead center) and the discharge stroke (in which the piston 36 is moved from the bottom dead center to the top dead center) are repeated, so that the brake fluid is sucked from the inlet port 14 and discharged from the outlet port 16.

During the above reciprocal movement of the piston 36, the volume of the sealed chamber 52 is also changed. Namely, the volume of the sealed chamber 52 is increased when the volume of the pump chamber 56 is increased, whereas the volume of the sealed chamber 52 is decreased when the volume of the pump chamber 56 is decreased. The inner pressure of the sealed chamber 52 is decreased in accordance with the increase of the volume thereof. According to the embodiment, the coil spring 58 is so designed that the spring force thereof can drive the piston 36 to move in the rightward direction even against the resistive force caused by the decrease of the inner pressure in the sealed chamber 52. As a result, the piston 36 is kept in a proper contact with the eccentric cam 70.

As above, during the reciprocal movement of the piston 36, the volume of the suction chamber 50 is increased when the volume of the pump chamber 56 is decreased, whereas the volume of the suction chamber 50 is decreased when the volume of the pump chamber 56 is increased. Accordingly, in the liquid pump HP1 (as well as in the liquid pump HP2), the suction of the brake fluid into the suction chamber 50 is carried out at the same time to the discharge of the brake fluid to the discharge chamber 28. The generation of pulsation is thereby suppressed, which is otherwise caused when the brake fluid is circulated in the hydraulic system H1 (and H2) by the liquid pump HP1 (and HP2). The generation of the pulsation is likewise suppressed in the fluid circulation passage, when the brake fluid is circulated from and back to the liquid pump (HP1, HP2) through the fluid circulation passage.

According to the above embodiment, the suction chamber 50 is formed in the middle portion (the first small diameter portion 12a) of the cylindrical hole 12, into which the right hand end of the third housing member 20 is inserted. Therefore, the inner diameter "Dk" of the suction chamber 50 is made larger than the inner diameter "Dc" of the cylindrical space 26 formed in the third housing member 20.

According to the above embodiment, the suction amount of the brake fluid can be increased while the outer diameter of the piston 36 is maintained at a large value, when compared with such a pump structure in which the inner diameter of the suction chamber 50 is designed to be equal to (or smaller than) the inner diameter of the cylindrical space 26. Accordingly, the suction amount can be designed to be almost equal to the discharge amount, such that the pulsation in the fluid paths is suppressed to a desirable range. And the mechanical strength of the piston 36 can be maintained at a high value. According to the embodiment, the inner diameters "Dc" and "Dk" are so designed that the volume decreasing amount for the pump chamber 56 in accordance with the movement of the piston 36 becomes almost equal to the volume increasing amount for the suction chamber 50 (i.e. the volume decreasing amount for the pump chamber 56 corresponds to 90% to 110% of the volume increasing amount for the suction chamber 50).

According to the embodiment, the annular flanged portion 46a axially extends from the annular body portion 46b in the direction toward the suction chamber 50. When the inner pressure in the sealed chamber 52 becomes higher than the inner pressure of the suction chamber 50 during the movement of the piston 36 in the leftward direction (toward the top dead center), the outer peripheral surface of the flanged portion 46a may be separated from the inner peripheral surface of the first small diameter portion 12a of the cylindrical hole 12, so that a part of the brake fluid may flow from the sealed chamber 52 into the suction chamber 50. The flow of the brake fluid from the suction chamber 50 to the sealed chamber 52 is generally prohibited. Therefore, the inner surface of the cylindrical hole 12 and the sliding ring 46 form a check valve, wherein the flanged portion 46a acts as a valve body and the inner surface of the cylindrical hole 12 acts as a valve seat.

According to the above structure, even when a part of the brake fluid may flow from the pump chamber 56 into the sealed chamber 52 through a small clearance between the outer peripheral surface of the piston 36 and the inner surface of the cylindrical space 26 due to the increase of the pressure difference, the brake fluid in the sealed chamber 52 may return to the suction chamber 50 through the gap formed between the flanged portion 46a and the inner surface of the cylindrical hole 12 during the volume decreasing process for the sealed chamber 52. As a result, even if the volume of the brake fluid in the sealed chamber 52 is increased, it is avoided that the sealed chamber 52 may increase a resistive force for pressurizing the brake fluid, or the sealed chamber 52 may excessively increase a resistive force for moving the piston 36 in the leftward direction.

As explained above, the function of the check valve is performed by the sliding ring 46, a number of parts for the liquid pump HP1, HP2 can be reduced and can be made in a simpler structure, when compared with such a liquid pump in which the check valve is separately provided from the sliding ring 46.

The above embodiment may be modified in various ways, for example, as in the following manner.

In the above first embodiment, the inner diameters "Dc" and "Dk" are so designed that the volume decreasing amount for the pump chamber 56 in accordance with the movement of the piston 36 becomes almost equal to the volume increasing amount for the suction chamber 50 (i.e. the volume decreasing amount for the pump chamber 56 corresponds to 90% to 110% of the volume increasing amount for the suction chamber 50). However, the inner diameters "Dc" and "Dk" may not be limited to the above relation, so long as the inner diameter "Dk" of the suction chamber 50 is designed to be larger than the inner diameter "Dc" of the cylindrical space 26.

Second Embodiment

Figure 4:
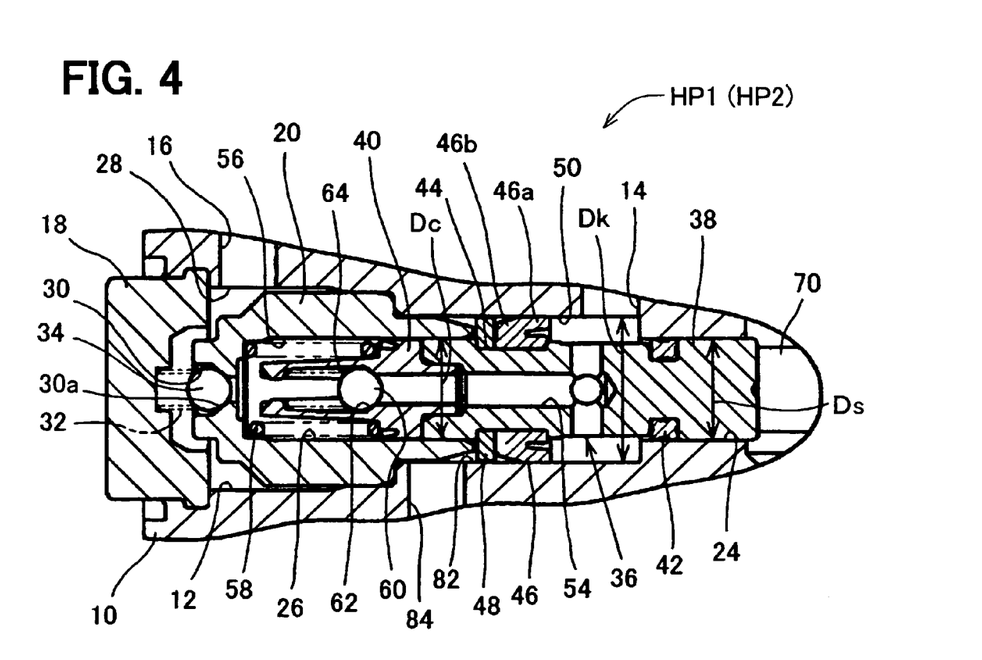
FIG. 4 is a cross sectional view showing a liquid pump of a second embodiment.

A second embodiment is shown in FIG. 4. The same reference numerals are used in the second embodiment for designating the same or similar parts to the first embodiment.

An air communication aperture 84 is provided in the first housing member 10, so that a volume changing chamber 82 (which corresponds to the sealed chamber 52 in FIG. 3) is opened to the atmospheric air. In the first embodiment, the sealed chamber 52 is isolated from the atmospheric air. As a result, the driving force for the piston 36 must be designed to be larger in order to overcome the reaction force caused by the expansion or contraction of the fluid in the sealed chamber 52. According to the second embodiment, however, the reaction force (the resistive force) for driving the piston 36 can be reduced, because the volume changing chamber 82 is communicated with the atmospheric air. Although not shown in FIG. 4, the other end of the air communication aperture 84 may be opened to the ambient air, or may be communicated with the main reservoir RS, in which the brake fluid is stored at the atmospheric pressure.

In the case, however, that the other end of the air communication aperture 84 is opened to the ambient air, the sliding ring 46 is designed, such that the air does not flow from the volume changing chamber 82 into the suction chamber 50 even when the hydraulic pressure in the suction chamber 50 becomes lower than the atmospheric pressure in the volume changing chamber 82 as a result of the reciprocal movement of the piston 36. Namely, the function of the check valve is not provided in the sliding ring 46.

Third Embodiment

Figure 5:
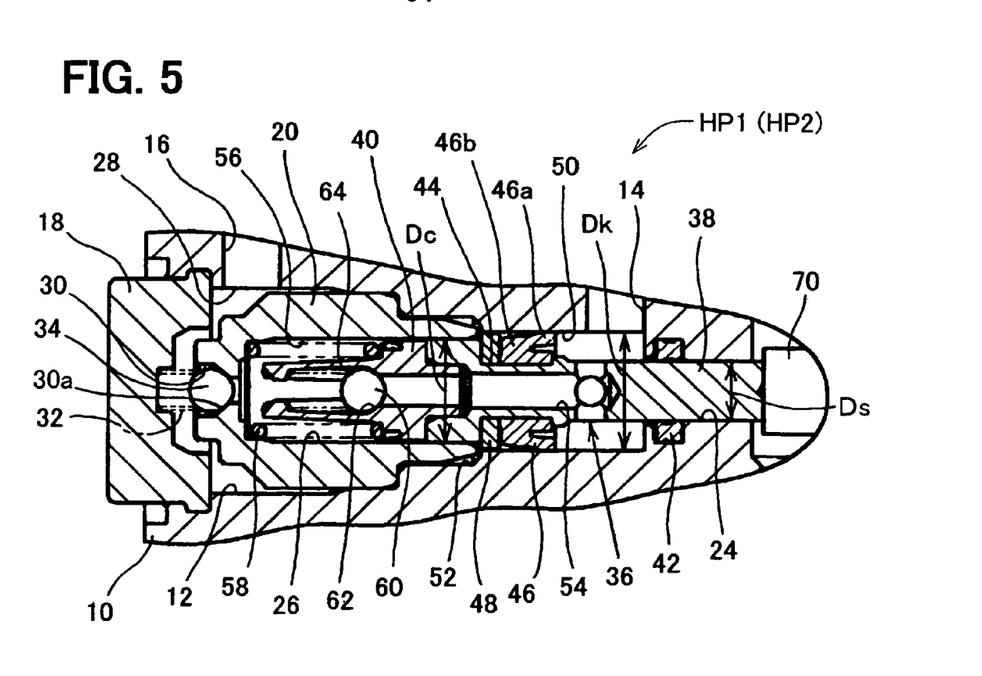
FIG. 5 is a cross sectional view showing a liquid pump of a third embodiment, wherein a piston is positioned at its top dead center.
Figure 6:
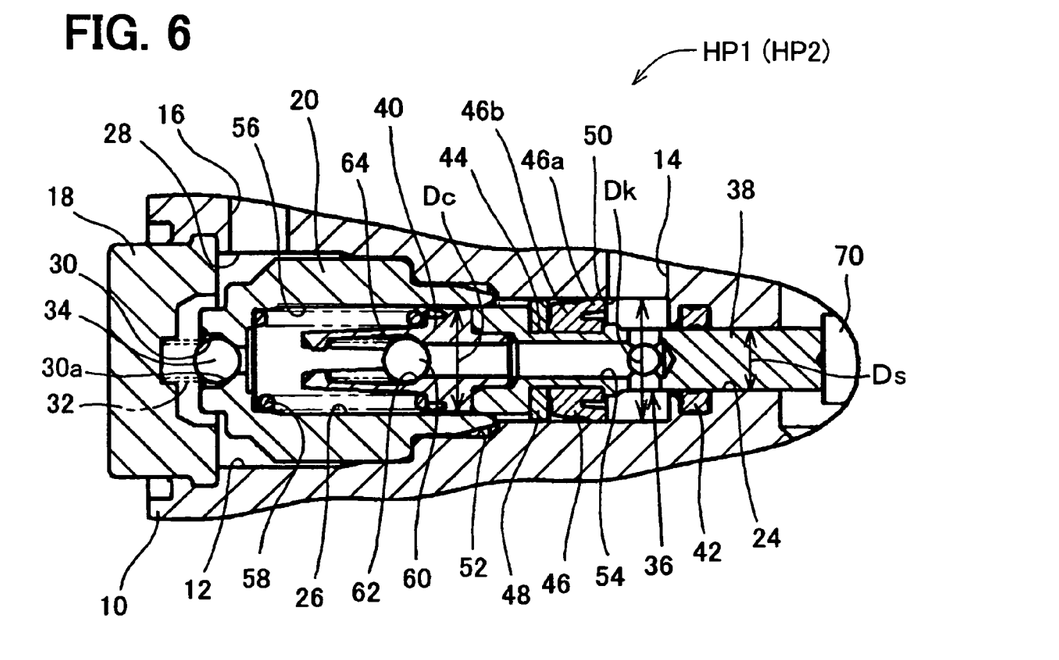
FIG. 6 is a cross sectional view showing the liquid pump of the third embodiment, wherein the piston is positioned at its bottom dead center.

A third embodiment is shown in FIGS. 5 and 6. The same reference numerals are likewise used in the third embodiment for designating the same or similar parts to the first embodiment.

As shown in FIGS. 5 and 6, the inner diameter "Ds" of supporting hole 24 may be made smaller than the inner diameter "Dc" of the cylindrical space 26. The supporting portion 38 of the piston 36 is made smaller to the extent that the mechanical strength of the supporting portion 38 may not cause any problem, in accordance with the small-sized inner diameter of the supporting hole 24.

According to such modification, the parts for forming the suction chamber 50 can be made smaller, while the suction volume is not decreased. As a result, the liquid pump HP1, HP2 can be made smaller, compared with the liquid pump in which the inner diameter "Ds" of the supporting hole 24 is equal to or larger than the inner diameter "Dc" of the cylindrical space 26.

FIG. 5 shows the position of the piston 36, which is at its top dead center, whereas FIG. 6 shows the position of the piston 36, which is at its bottom dead center.

In the above first to third embodiments, the inner diameter "Ds" of the supporting hole 24 is equal to or smaller than the inner diameter "Dc" of the cylindrical space 26. However, the inner diameter "Ds" of the supporting hole 24 may be larger than the inner diameter "Dc" of the cylindrical space 26.

In the first embodiment, in which the sealed chamber 52 is formed and the function of the check valve is provided for the sliding ring 46. However, the function of the check valve may not be provided.

The hydraulic systems may not be limited to those hydraulic systems H1 and H2. Furthermore, the arrangements and/or structures for the electromagnetic valves, the check valves, and the sub reservoirs may be modified in various ways.

What is claimed is:

1. A braking system for a vehicle comprising:
   a hydraulic system for applying braking pressure to a braking device of a wheel for the vehicle;
   a return fluid path, forming a part of the hydraulic system, and operatively communicated with a wheel cylinder of the braking device for circulating brake fluid from the wheel cylinder in the hydraulic system; and
   a liquid pump provided in the return fluid path, wherein the liquid pump comprises;
   a pump housing and a piston;
   a suction chamber formed in a cylindrical hole of the pump housing, into which the brake fluid is sucked through an inlet port formed in the pump housing;
   a cylindrical space formed in the pump housing, into which one end of the piston is fluid-tightly and slidably inserted to form a pump chamber, so that the suction chamber is operatively communicated with the pump chamber and the brake fluid supplied from the suction chamber into the pump chamber is pressurized;
   a supporting hole formed in the pump housing and coaxially arranged with the cylindrical hole and the cylindrical space, the other end of the piston being fluid-tightly and slidably inserted into the supporting hole; and
   a sliding ring provided at the piston and slidably in contact with an inner peripheral surface of the cylindrical hole for fluid-tightly sealing a space between an outer peripheral surface of the piston and the inner peripheral surface of the cylindrical hole of the pump housing, so that the suction chamber is formed by the pump housing, the piston, and the sliding ring,
   wherein the inlet port is formed in the pump housing so as to always open to the suction chamber at the inner peripheral surface of the cylindrical hole,
   wherein the suction chamber increases its volume when a volume of the pump chamber is decreased in accordance with a reciprocal movement of the piston, whereas the suction chamber decreases its volume when the volume of the pump chamber is increased in accordance with the reciprocal movement of the piston, and
   wherein an inner diameter "Dk" of the cylindrical hole of the pump housing for forming the suction chamber is made larger than an inner diameter "Dc" of the cylindrical space.

2. A braking system according to claim 1, wherein
   a volume changing chamber is formed in the space between the outer peripheral surface of the piston and the inner peripheral surface of the pump housing, and separated from the suction chamber by means of the sliding ring, so that the volume changing chamber increases its volume when the volume of the pump chamber is increased in accordance with the reciprocal movement of the piston, whereas the volume changing chamber decreases its volume when the volume of the pump chamber is decreased in accordance with the reciprocal movement of the piston,
   the volume changing chamber is formed as a sealed chamber, and
   a check valve is provided for allowing the brake fluid to flow only from the sealed chamber into the suction chamber.

3. A braking system according to claim 2, wherein
   the sliding ring is made of elastic material and has an annular body portion and annular flanged portion, and
   the annular flanged portion is slidable with respect to the inner peripheral surface of the pump housing, and arranged at a position closer to the suction chamber than the annular body portion, so that the check valve is formed.

4. A braking system according to claim 1, wherein
   a volume changing chamber is formed in the space between the outer peripheral surface of the piston and the inner peripheral surface of the pump housing, and separated from the suction chamber by means of the sliding ring, so that the volume changing chamber increases its volume when the volume of the pump chamber is increased in accordance with the reciprocal movement of the piston, whereas the volume changing chamber decreases its volume when the volume of the pump chamber is decreased in accordance with the reciprocal movement of the piston, and
   an air communication aperture is formed in the pump housing, so that the volume changing chamber is communicated with the atmospheric air.

5. A braking system according to claim 1, wherein
   an inner diameter "Ds" of the supporting hole is made smaller than the inner diameter "Dc" of the cylindrical space.

6. A braking system according to claim 2, wherein
   an inner diameter "Ds" of the supporting hole is made smaller than the inner diameter "Dc" of the cylindrical space.

7. A braking system according to claim 3, wherein
   an inner diameter "Ds" of the supporting hole is made smaller than the inner diameter "Dc" of the cylindrical space.

8. A braking system for a vehicle comprising:
a main fluid path operatively communicated with a braking device of a vehicle wheel to deliver braking fluid to the braking device;
a return fluid path operatively communicated with a wheel cylinder of the braking device to circulate the brake fluid from the wheel cylinder; and
a liquid pump in the return fluid path, the liquid pump comprising:
a pump housing and a piston, the pump housing comprising a cylindrical hole and an inlet port, the piston being axially movable relative to the pump housing and possessing one end and an other end;
a suction chamber in the cylindrical hole of the pump housing into which the brake fluid is sucked through the inlet port;
a cylindrical space in the pump housing into which the one end of the piston is fluid-tightly and slidably positioned, with a pump chamber defined by the one end of the piston and a wall surrounding the cylindrical space, and the suction chamber being operatively communicated with the pump chamber so that the brake fluid supplied from the suction chamber into the pump chamber is pressurized;
a supporting hole in the pump housing coaxially arranged with the cylindrical hole and the cylindrical space, the other end of the piston being fluid-tightly and slidably positioned into the supporting hole;
a sliding ring positioned between an outer peripheral surface of the piston and an inner peripheral surface surrounding the cylindrical hole, the sliding ring being in sliding contact with the inner peripheral surface surrounding the cylindrical hole to seal in a fluid-tight manner a space between the outer peripheral surface of the piston and the inner peripheral surface of the cylindrical hole so that the pump housing, the piston and the sliding ring together define the suction chamber;
the inlet port of the pump housing always opening to the suction chamber at the inner peripheral surface of the cylindrical hole;
the suction chamber increasing in volume when a volume of the pump chamber is decreased during axial movement of the piston in one direction, and the suction chamber decreasing in volume when the volume of the pump chamber is increased during axial movement of the piston in a direction opposite the one direction; and
the cylindrical hole of the pump housing forming the suction chamber possessing an inner diameter that is larger than an inner diameter of the cylindrical space.

9. A braking system according to claim 8, comprising:
a volume changing chamber between the outer peripheral surface of the piston and a inner peripheral surface of the pump housing, the volume changing chamber being separated from the suction chamber by the sliding ring, the volume changing chamber increasing in volume when the volume of the pump chamber is increased during axial movement of the piston in the direction opposite the one direction, and the volume changing chamber decreasing in volume when the volume of the pump chamber is decreased during axial movement of the piston in the one direction;
the volume changing chamber is a sealed chamber; and
a check valve positioned to allow the brake fluid to flow only from the sealed chamber into the suction chamber.

10. A braking system according to claim 9, wherein
the sliding ring is made of elastic material and has an annular body portion and annular flanged portion, and the annular flanged portion is slidable with respect to the inner peripheral surface of the pump housing, the annular flanged portion being arranged at a position closer to the suction chamber than the annular body portion to form the check valve.

11. A braking system according to claim 8, comprising:
a volume changing chamber between the outer peripheral surface of the piston and an inner peripheral surface of the pump housing, the volume changing chamber being separated from the suction chamber by the sliding ring, the volume changing chamber increasing in volume when the volume of the pump chamber is increased during axial movement of the piston in the direction opposite the one direction, the volume changing chamber decreasing in volume when the volume of the pump chamber is decreased during axial movement of the piston in the direction opposite the one direction; and
an air communication aperture in the pump housing communicating the volume changing chamber with atmospheric air.

12. A braking system according to claim 8, wherein an inner diameter of the supporting hole is smaller than the inner diameter of the cylindrical space.

13. A braking system according to claim 9, wherein an inner diameter of the supporting hole is smaller than the inner diameter of the cylindrical space.

14. A braking system according to claim 10, wherein an inner diameter of the supporting hole is smaller than the inner diameter of the cylindrical space.

* * * * *